United States Patent [19]

Bishop et al.

[11] 4,079,797

[45] Mar. 21, 1978

[54] BILLET WEIGHING APPARATUS

[75] Inventors: Earl Bishop, Cuyahoga Falls; Robert W. Herrmann, Alliance, both of Ohio

[73] Assignee: Eagle-Picher Industries, Inc., Cincinnati, Ohio

[21] Appl. No.: 780,695

[22] Filed: Mar. 24, 1977

[51] Int. Cl.$^2$ .................. G01G 19/00; G01G 3/14; G01G 13/00
[52] U.S. Cl. .................... 177/145; 177/211; 214/2
[58] Field of Search ............. 177/146, 211, 145; 214/2

[56] References Cited

U.S. PATENT DOCUMENTS

| | | | |
|---|---|---|---|
| 3,299,609 | 1/1967 | Hill | 177/145 X |
| 4,023,685 | 5/1977 | Bishop et al. | 214/1 QG |

FOREIGN PATENT DOCUMENTS

| | | | |
|---|---|---|---|
| 859,630 | 1/1961 | United Kingdom | 177/211 |
| 493,646 | 2/1976 | U.S.S.R. | 177/146 |

*Primary Examiner*—George H. Miller, Jr.
*Attorney, Agent, or Firm*—Wood, Herron & Evans

[57] ABSTRACT

Apparatus for weighing a billet adapted for use in conjunction with a billet manipulator. The weighing apparatus includes two or more cooperating billet weighing arms pivoted at one end to the billet manipulator which support the billet at their opposite end for weighing. Each arm has two planes of measurement spaced apart by fixed predetermined distance and the apparatus includes instrumentation which measures the bending moment on each arm at the two planes. The weight of the billet is proportional to the summation of the difference between the bending moments at the two planes for each arm and is independent of billet geometry or positioning of the billet on the apparatus.

12 Claims, 3 Drawing Figures

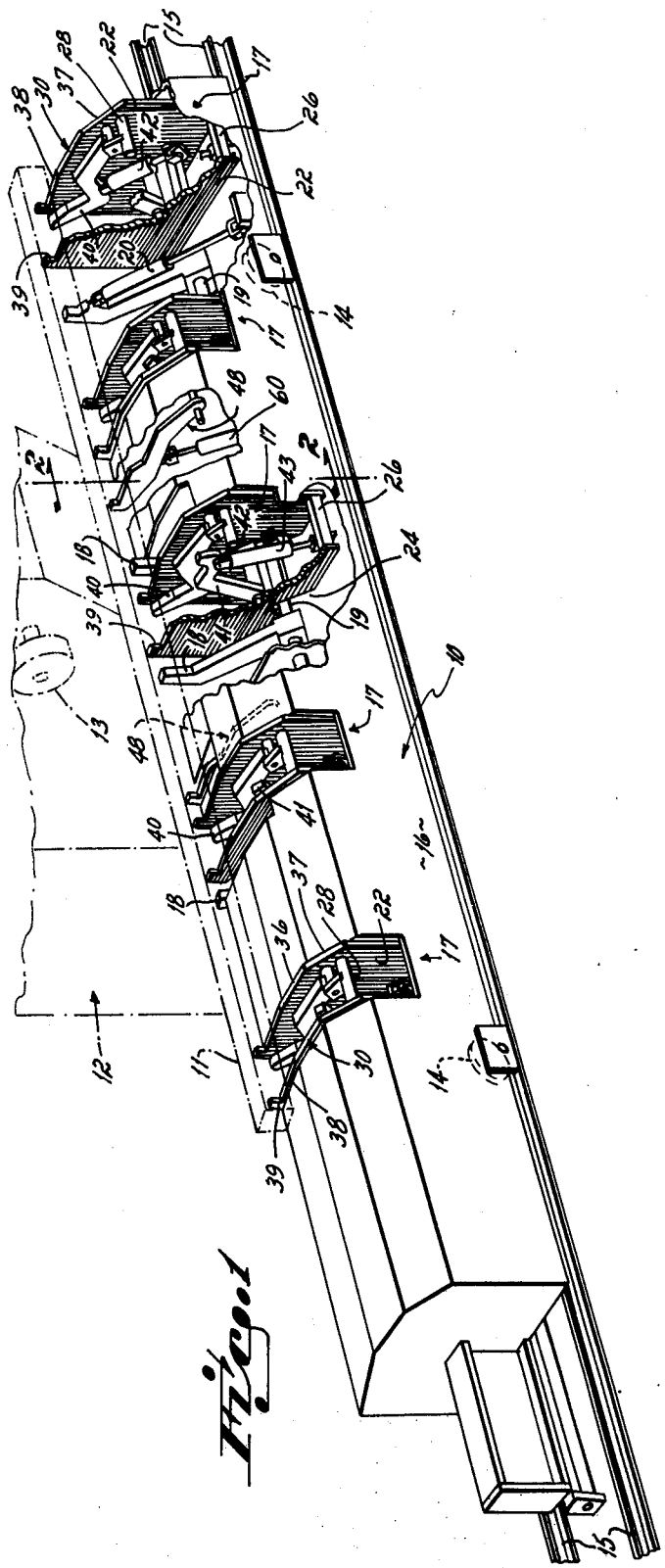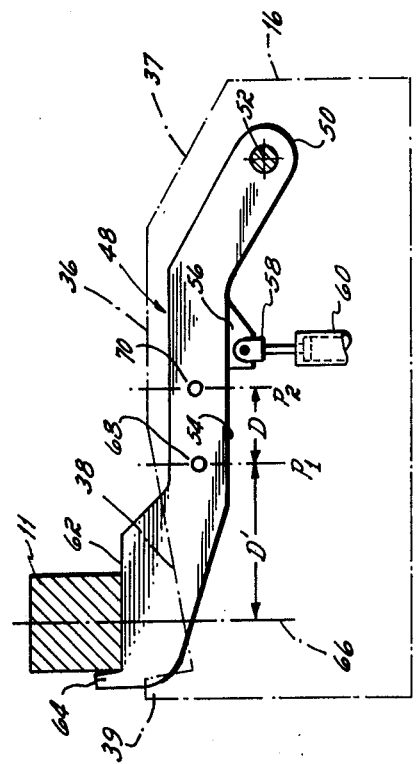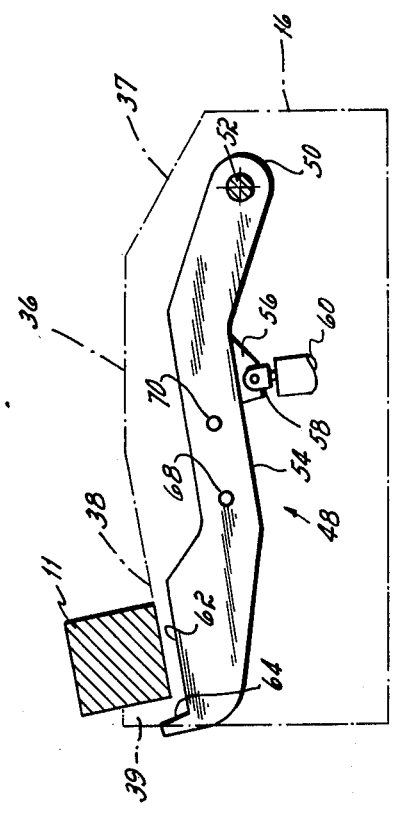

BILLET WEIGHING APPARATUS

BACKGROUND OF THE INVENTION

This invention relates generally to a billet manipulator or billet handling apparatus and, more particularly, to a billet weighing apparatus for a billet manipulator.

In the grinding of billets such as elongated steel billets which are quite large as, for example, up to thirty feet long and sixteen inches square, the billets are placed on a car and moved past a grinding wheel where the scale formed on the surface of the billet from its manufacture is removed. The car is slowly moved longitudinally past a grinding station where an operator causes a grinding wheel to move transversely back and forth over the surface of the billet as the billet car conveys the billet under the grinding wheel. After each pass of the billet through a grinding operation, the billet is rotated to present a fresh surface for grinding. In the manufacture of billets, there is a need to be able to weigh each billet either before or after grinding or both. Weighing of the billet in this manner can provide important process control information regarding the yield of the process in terms of the tonnage of billets manufactured both before grinding and after grinding.

An objective of the present invention has been to provide a weighing apparatus for a billet manipulator and particularly one which provides rapid and accurate weighing of the billet on the billet car during the grinding phase of the billet manufacture.

It has been another objective of this invention to provide a billet weighing apparatus which is adapted to be mounted in conjunction with the billet manipulator to provide accurate weighing of billets of various sizes and cross-sections independent of the positioning of the billet on the weighing apparatus.

It has been a further objective of this invention to provide a billet weighing apparatus wherein the weighing of the billet is independent of such variables as the accumulation of scale on the weighing apparatus which commonly occurs in a production operation.

It has been another objective of this invention to provide a billet weighing apparatus which admits of the use of a variety of instrumentation thereby providing flexibility in the type of instrumentation which may be used as well as the integration of that instrumentation to provide desired production information.

SUMMARY OF THE INVENTION

These and other objects of the invention are accomplished by providing a billet weighing apparatus for use in conjunction with a billet manipulator including two or more cooperating billet weighing arms pivotally mounted at one end to the frame of the billet manipulator and having a billet supporting end remote therefrom. The billet weighing arms swing between a retracted position wherein the arms are recessed below the billet supporting surface of the manipulator and a weighing position wherein the arms engage the underside of the billet and support the billet off of the frame. In this cradled attitude, the billet is weighed. Each of the weighing arms has two planes of measurement which are outboard of the fixed reaction points of the arms and are spaced apart by a fixed predetermined distance. Instrumentation in association with the arms is operative to determine the bending moments at each of these planes. The weight of the billet is proportional to the difference between the bending moments at the planes of measurement on an arm summed for each arm. In one form of the invention, instrumentation which includes strain gauges mounted in each arm generates a voltage signal proportional to the difference in bending moments for each arm. The weight of the billet is then determined by summing these voltage signals.

The present invention provides for weighing of the billet independent of billet geometry, the location of the billet on the weighing arm, and the number of weighing arms employed. That is, since the distance between the centerline of mass of the billet and the planes of measurement does not enter into the determination of the billet weight, billets of various cross-sections can be accurately weighed. Furthermore, any criticality as to the positioning of the billet on the arms has been eliminated. Moreover, since the instrumentation is zeroed immediately prior to weighing, weighing of the billet is independent of any accumulation of scale on the arms or other variables encountered in the production of metal billets.

Other objects and advantages of the invention will become apparent from the following detailed description reference being had to the accompanying drawings.

BRIEF DESCRIPTION OF THE DRAWINGS

FIG. 1 is a perspective view with parts broken away of a billet manipulator embodying the present invention;

FIG. 2 is a cross-sectional view taken along line 2—2 of FIG. 1 showing the weighing apparatus in the retracted position; and FIG. 3 is a schematic view similar to FIG. 2 but showing the weighing apparatus in its raised, weighing position.

DETAILED DESCRIPTION OF THE INVENTION

Although the present invention is applicable to any of a variety of billet manipulators wherein the manipulator generally includes a frame which receives and supports an elongated billet together with one or more billet manipulating arms which are pivoted to the frame structure for swinging about the frame to rotate the billet through increments of movement, it will be described in conjunction with the particular billet manipulator disclosed in U.S. Pat. No. 4,023,685 entitled "Billet Manipulator" and assigned to the assignee of this invention. It will be appreciated, of course, that this is merely for purposes of description and that the invention is not restricted to a particular billet manipulator.

Referring to FIG. 1, there is shown a billet car 10 carrying a billet 11 (shown in phantom) located adjacent a grinding station 12 which supports a grinding wheel 13 (also shown in phantom) for transverse movement with respect to the car 10 and billet 11. The car 10 is mounted on four large wheels 14 which engage tracks 15 to permit the car 10 to be rolled past the grinding station 12. Any suitable drive mechanism such as a rack and pinion (not shown) may be used to cause the car to be moved past the grinding station. The car 10 includes a generally rectangular frame 16 within which are supported five lift and clamp modules 17 and four eject arms 18, spaced along the length of the frame. The eject arms 18 are all fixed to a common shaft 19 and are operated by two hydraulic rams 20 located at each end of the car.

Each lift and clamp module 17 includes two vertical plates 22 joined to the frame 16 and forming part of the frame. The plates are spaced apart and are joined together by fixed blocks 26 and fixed tubes 28. The lower edges of the plates 22 are notched out as at 24 to permit the passage of the shaft 19 for the eject arms 18.

Each plate has a hardened steel strap 30 tack welded to its upper edge to provide a supporting surface for the billet 11. The supporting surface has a generally horizontal center section 36, downwardly sloping eject section 37 and downwardly sloping grinding section 38. The billet 11 rests on the downwardly sloping grinding section 38 during the grinding process. The billet is thus sloped towards the operator for better viewing and corner grinding. At the corner of each plate 22 adjacent the grinder side of the car, an abutment 39 projects above the surface 38 which is engaged by the billet during grinding.

The lift and clamp modules 17 include two arms 40 and 41 which are actuable by hydraulic lift and clamp cylinders 42 and 43, respectively. The arms 40, 41 are pivoted at one end and the lift and clamp cylinders are double-acting to swing the lift arm from a lower position to an upper position to effect rotation of the billet and to move the clamp arm into and out of clamping engagement, respectively, as described in detail in the above-referenced patent, which is incorporated herein by reference.

Spaced along the car 10 are a pair of billet weighing arms 48. The weighing arms 48 are shown in FIG. 2. Preferably, three arms are employed so as to accommodate billets of varying lengths with the billet being weighed always using at least two of the arms.

The weighing arm 48 has one end 50 pivotally mounted to the plate 22 on an axis 52. The arm 48 has a lower edge 54 presenting an ear 56 which is pivotally secured to a clevis 58 fixed on the end of a hydraulic lift cylinder 60. The lift cylinder at its other end (not shown) is pivotally secured to the frame 16. The lift cylinder 60 is operative to swing the weighing arm 48 from a lowered or retracted position (FIG. 2) wherein the arm 48 is below the supporting surface 38 to a raised, weighing position (FIG. 3).

The free end of the arm 48 has a billet supporting surface 62 which in the raised position is substantially horizontal although this is not critical. An abutment 64 projects above the surface 62 and is engageable by a billet when the weighing arm 48 is raised to hold the billet on the weighing arm. When the arm 48 is in its retracted position, it is below the surface 38 and does not interfere with the billet manipulating operation. When the arm 48 is raised, the surface 62 engages the underside of the billet 11 lifting it off the surface 38 and cradling the billet in this raised position.

The arm 48 has two planes of measurement P1 and P2 which lie between the support surface 62 and the ear 56 and as such lie on that portion of the arm 48 which is cantilevered outboard of the reaction point at the joinder of the clevis 58 to the ear 56. The theory of the weighing operation is as follows. The planes of measurement P1 and P2 are separated by a fixed distance D. In the weighing position, the weight of the billet acts through the centerline 66 of its mass which lies the distance D' from plane P1, as schematically illustrated in FIG. 3. The weight of the billet causes bending moments M1 and M2, respectively, at the planes P1 and P2. The moment M1 equals the weight W of the billet times the distance D'. The moment M2 equals the weight W of the billet times the distance D' plus the distance D. The weight W of the billet is thus calculated as follows:

$$M1 = WD'$$

$$M2 = WD' + WD$$

$$M2 - M1 = WD$$

This distance D is fixed and the weight W is thus a function only of the moments M1 and M2 and the distance D between planes P1 and P2 and therefore is independent of the position of the centerline 66 of the billet with respect to the planes P1 and P2. Accordingly, if the billet 11 is shifted out of position, no error is caused in determining the weight of the billet. Nor is it necessary for the billet to be accurately positioned on the arm 48.

The particular means by which the bending moments M1 and M2 are determined and their difference calculated is not critical to the invention and any of a number of means may be employed. In the embodiment illustrated schematically in FIG. 3, two holes 68 and 70 are drilled perpendicular to the side of the weighing arm 48 at the planes P1 and P2. In these holes are mounted electrical resistance strain gauges whose resistances change with deflection of the arm in proportion to the moments M1 and M2 at the planes P1 and P2. The strain gauge wires protrude out of the holes and join the festooned electrical cables bringing power to the system from a fixed location. The strain gauge wires are connected to instrumentation, e.g., a Wheatstone bridge, which generates a voltage signal proportional to the difference between M2 and M1. The individual voltage signals for each of the arms are then added by instrumentation, e.g., a summing amplifier, to produce a voltage which is proportional to the total weight of the billet. This weight can conveniently be displayed, e.g., by a digital readout in the control room or operator's cab to permit its logging or recording. Likewise, the summed voltage signal can be integrated with other instrumentation to give other information such as the yield of the process, production figures, and heat and tonnage logging.

As previously stated, the particular instrumentation employed is not critical to the invention and other means for measuring deflection or bending of the arm may be used. By way of examples, such means may include linear voltage displacement transducers, proximity detectors, extensometers, or even optical detectors. These devices and their operation are well known, and the manner of their employment to measure the difference in moments M1 and M2 is within the skill of the art.

OPERATION

The particular point or points in the grinding process at which the weight of the billet is determined is a matter of choice.

That is, the billet may be weighed before grinding, at any position during rotation or thereafter as desired. In one form of the invention, it is desired to weigh the billet both before and after grinding to thereby determine the gross amount of metal processed as well as the yield after grinding. Accordingly, for purposes of description, the operation of the invention will be described in this mode of operation.

In the illustrated form of the invention, the apparatus is adapted to manipulate and weigh rectangular billets, not necessarily square, which range from 6 × 6 to 16 ×

16. It should be understood that the invention is of course not restricted to manipulation of billets within that range, for with modifications well within the skill of the art billets of greater or lesser sizes can be handled. It should be further understood that this invention is not restricted to the weighing of approximately square or rectangular billets alone but covers weighing of any form of steel shapes such as rounds, blooms, and the like, the use of the term "billet" herein is intended to include such shapes.

A billet 11 is first deposited onto the surface 38 from a load table (not shown). The clamp cylinder 43 is actuated to move the billet against the abutment 39 where it is shown in FIG. 1. When in this position, the lift cylinders 60 for the weighing arms 48 are actuated to bring the weighing arms under the billet. Immediately prior to engagement of the billet by the weighing arms, the weighing instrumentation is zeroed. Thus, accumulations on the arms such as scale will not enter into the weight. As the weighing arms continue to swing upwardly, the billet is raised off of the surface 38 and is cradled by the weighing arms (FIG. 3). In this position, the billet is supported solely by the weighing arms. The instrumentation associated with the weighing arms generates signals measuring the bending moments M1 and M2 at the planes P1 and P2 on each arm. These signals are read and the difference M2 − M1 determined for each arm. The weight of the billet is determined by totaling these differences, all of which is done by the weighing instrumentation. The weighing arms 48 are then retracted and the billet returned to its position on the surface 38.

The billet car 10 is driven longitudinally to carry the billet past the grinder where the grinding wheel 12 is caused to move transversely back and forth over the surface of the billet. At the end of a traverse of the billet car past the grinder, the lift and clamp modules are actuated to rotate the billet to present a new surface to the grinding wheel. Rotation is repeated until the completion of the grinding operation on all surfaces of the billet. After the final grinding operation, the weighing arms are again energized to lift the billet and weigh it to determine the weight of the billet after grinding. After the final weighing operation, the clamp arm is retracted below the surface and the eject rams 20 are energized to cause the eject arms to swing in a direction away from the grinding side of the car. In swinging, the projecting upper ends 39 of the eject arms sweep across the upper surface of the frame pushing the billet off the frame into a waiting cradle for further processing.

Thus having described the invention, what is claimed is:

1. A weighing apparatus for a billet manipulator including a frame presenting an upper supporting surface for receiving an elongated billet, said apparatus comprising,
   at least two cooperating billet weighing arms, each said arm having a billet supporting end and being pivoted to said frame,
   means for swinging said arms up and down between a weighing position wherein said arms support said billet off said frame and a retracted position, each said arm having first and second planes of measurement, said planes being separated by a fixed distance,
   said arms being adapted to receive means for determining the difference between the bending moments on said arms at said first and second planes in said weighing position, the weight of said billet being proportional to the summation of said difference between said bending moments for each said arm.

2. The weighing apparatus of claim 1 wherein said billet supporting end includes a billet supporting surface which lies in a substantially horizontal plane in said weighing position.

3. The weighing apparatus of claim 1 wherein said billet supporting end engages the underside of said billet.

4. The weighing apparatus of claim 1 wherein said means for swinging said arms comprises fluid pressure operated rams each pivoted at one end to said frame and at the other end to a respective arm.

5. The weighing apparatus of claim 1 wherein said means for determining the difference between the bending moments on said arms comprises electrical resistance strain gauges.

6. The weighing apparatus of claim 5 wherein said strain gauges are mounted in first and second holes in the side of said weighing arms whose axes lie on said first and second planes, respectively.

7. A weighing apparatus for a billet manipulator including a frame presenting an upper supporting surface for receiving an elongated billet, said apparatus comprising,
   at least two cooperating billet weighing arms, each said arm having a billet supporting end and an end remote therefrom being pivoted to said frame,
   means intermediate said ends for swinging said arms up and down between a weighing position wherein said arms support said billet off said frame and a retracted position wherein said arms lie below said upper support surface, each said arm having first and second planes of measurement located between said billet supporting end and said swinging means, said planes being separated by a fixed distance,
   said arms being adapted to receive means in association therewith for determining the difference between the bending moments on said arms at said first and second planes in said weighing position, the weight of said billet being proportional to the summation of said difference between said bending moments for each said arm.

8. The weighing apparatus of claim 7 wherein said means for determining the difference between the bending moments on said arms comprises electrical resistance strain gauges.

9. The weighing apparatus of claim 8 wherein said strain gauges are mounted in first and second holes in the side of said weighing arms whose axes lie on said first and second planes, respectively.

10. A weighing apparatus for a billet manipulator including a frame presenting an upper supporting surface for receiving an elongated billet, said apparatus comprising,
    at least two cooperating billet weighing arms, each said arm having a billet supporting end and being pivoted to said frame,
    means for swinging said arms up and down between a weighing position wherein said arms support said billet off said frame and a retracted position, each said arm having first and second planes of measurement outboard of the fixed reaction points on said arm, said planes being separated by a fixed distance, a weight-sensing system associated with said arms, said system being operative to determine the difference between the bending moments on said arms at said first and second planes in said weighing position, the weight of said billet being proportional to the summation of said difference between said bending moments for each said arm.

11. In a billet manipulator comprising a frame presenting an upper supporting surface, a lift arm pivoted to said frame at one end and having an L-shaped free end having an upwardly projecting leg, means for swinging said arm up and down, said leg upon upward movement of said arm being engageable with the underside of a billet supported on said surface to rotate said billet through an angle greater than 45°, said billet upon downward movement of said arm engaging said surface and rotating through an angle to rest on the surface of said frame; the improvement comprising at least two cooperating billet weighing arms, each said arm having a billet support end and being pivoted to said frame; and means for swinging said arms up and down between a weighing position wherein said arms support said billet off said frame and a retracted position, each said arm having first and second planes of measurement, said planes being separated by a fixed distance; said arms being adapted to receive means for determining the difference between the bending moments on said arms at said first and second planes in said weighing position, the weight of said billet being proportional to the summation of said difference between said bending moments for each said arm.

12. A weighing apparatus for a billet manipulator including a frame presenting an upper supporting surface for receiving an elongated billet, said apparatus comprising,
- at least two cooperating billet weighing arms, each said arm having a billet supporting end and being pivoted to said frame,
- means for swinging said arms up and down between a weighing position wherein said arms support said billet on said billet supporting ends off said frame and a retracted position, and
- weighing means associated with said arms being operative to weigh said billet in said weighing position independent of the positioning of said billet on said arms.

* * * * *

UNITED STATES PATENT AND TRADEMARK OFFICE
CERTIFICATE OF CORRECTION

PATENT NO. : 4,079,797
DATED : March 21, 1978
INVENTOR(S) : Earl Bishop et al

It is certified that error appears in the above–identified patent and that said Letters Patent are hereby corrected as shown below:

Column 4, line 68, " 6 x 6 " should be -- 6" x 6" --.

Column 4, line 68, " 16 x " should be -- 16" x --.

Column 5, line 1, " 16 " should be -- 16" --.

Signed and Sealed this

Fourth Day of July 1978

[SEAL]

Attest:

RUTH C. MASON
*Attesting Officer*

DONALD W. BANNER
*Commissioner of Patents and Trademarks*